United States Patent [19]

Boutin et al.

[11] 4,252,625
[45] Feb. 24, 1981

[54] PREPARATION OF WATER SOLUBLE POLYMERIC FLOCCULANTS BY PHOTOPOLYMERIZATION OF HYDROPHILIC MONOMERS

[75] Inventors: Jean Boutin, Mions; Jean Neel, Lyons, both of France

[73] Assignee: Rhone-Poulenc Industries, Paris, France

[21] Appl. No.: 46,489

[22] Filed: Jun. 7, 1979

[30] Foreign Application Priority Data

Jun. 9, 1978 [FR] France ................................ 78 17857

[51] Int. Cl.$^3$ ........................ C08L 33/00; C08L 33/02
[52] U.S. Cl. ........................ 204/159.22; 204/159.23; 210/734
[58] Field of Search ...................... 204/159.22, 159.23; 210/44

[56] References Cited

U.S. PATENT DOCUMENTS

| 3,515,657 | 6/1970 | Nakanome et al. | 204/159.22 |
|---|---|---|---|
| 4,049,605 | 9/1977 | Kobashi et al. | 204/159.22 |

Primary Examiner—Maurice J. Welsh
Attorney, Agent, or Firm—Burns, Doane, Swecker & Mathis

[57] ABSTRACT

Water soluble polymeric flocculants are prepared by photopolymerizing olefinically unsaturated hydrophilic monomer(s), the medium of photopolymerization being enveloped in a moist, humid gaseous atmosphere. The humidity of the enveloping environment facilitates solubilization of the resultant flocculants, without substantial decrease in the molecular weights thereof, and ensures against the by-production of water insoluble fractions.

21 Claims, No Drawings

PREPARATION OF WATER SOLUBLE POLYMERIC FLOCCULANTS BY PHOTOPOLYMERIZATION OF HYDROPHILIC MONOMERS

CROSS-REFERENCE TO RELATED APPLICATION

Our copending application, Ser. No. 46,488, filed concurrently herewith, June 7, 1979, assigned to the assignee hereof, and hereby expressly incorporated by reference in its entirety and relied upon.

BACKGROUND OF THE INVENTION

1. Field of the Invention

The present invention relates to the photopolymerization of hydrophilic monomers and to the water soluble polymers resulting therefrom, as well as the use of such polymers as polymeric flocculants.

2. Description of the Prior Art

It is well known to this art to prepare polymeric flocculating agents via photopolymerization of acrylic monomers, specifically acrylamide, methacrylamide, acrylic or methacrylic acids, optionally the salts thereof, and quaternary ammonium salts derived from dialkylaminoalkyl (meth)acylates.

A plurality of characteristics and properties is typically required of such organic polymeric flocculating agents and of the respective processes for the preparation thereof, certain of which are often contradictory and mutually inconsistant, i.e.,: the polymeric flocculating agents must be water soluble; they must have molecular weights as high as possible (high intrinsic viscosity); when dissolved in water, they must, if possible, leave no insoluble residue; their speed of dissolution in water must be as high as possible; it must be possible to produce such polymeric flocculants by polymerization of an aqueous monomer solution which is as highly concentrated as possible in order that the output of the production facility will be high, while, simultaneously, the heat generated during polymerization, or exotherm, must be quickly dissipated such that as low a temperature as possible is maintained in the polymerization recipe to prevent degradation of polymer, a reduction in molecular weight, and the possible formation of insoluble fractions in the water; and, finally, it is necessary that the polymerization quickly proceed to as advanced a stage as is possible, in order that the content of residual monomer or monomers in the flocculant be as low as possible.

It is moreover, quite difficult to attain and reconcile all of the foregoing objectives when the monomers are pure, but it is even more difficult when the monomers contain impurities.

In our aforenoted copending application, there is disclosed and claimed a certain improved process for the thin layer photopolymerization of olefinically unsaturated hydrophilic monomers into high quality, water soluble polymeric flocculants, even in the event that the starting material monomers are not the highest in purity. Such process features the continuous deposition, onto a traveling endless conveyor belt, of a thin layer or film of an aqueous solution of the monomer(s), said solution comprising a photopolymerization promoter and a particular solubilization facilitating polyhydroxy additive, and then exposing the deposited thin layer to irradiation with light rays having a wavelength between 150 and 500 m$\mu$.

In the basic thin layer photopolymerization process of the type disclosed in our said copending application, it is a characteristic thereof that the viscosity of the medium undergoing photopolymerization progressively increases, i.e., the polymerizing liquid becomes more and more viscous, is transformed into a gel, and then into a layer of rubbery consistency, and/or, in certain instances, into a hard solid layer.

As above indicated, the production of water soluble polymeric flocculating agents essentially devoid of a fraction of insolubles is a desideratum in this art. Unfortunately, however, most of the photopolymerizations designed to afford same are characterized by reaction parameters which favor the by-production of just such insoluble fractions. Among such parameters, there are mentioned:

[i] Increasing the duration and/or the intensity of irradiation for purposes of reducing the content of residual monomer in the resultant flocculating agent;

[ii] Acceleration of the photopolymerization by any one of a great variety of means;

[iii] Increasing the monomer(s) concentration of the aqueous solutions subjected to irradiation;

[iv] Utilizing operating conditions which favor production of high molecular weight polymers (i.e., polymers having high intrinsic viscosities);

[v] The use of UV radiation lamps of high thermal energy (particularly high pressure mercury lamps); and

[vi] Lowering the pH of the photopolymerization medium, especially the accidental lowering of pH.

Moreover, it further appears that the insoluble fractions, if any be present, are not all of the same appearance and/or nature. Some are flocculent or gelatinous in appearance. Others are foliated, often inwardly curving or reflecting an "onionskin" design.

Finally, even if a given photopolymerization be devised for the bench scale or pilot plant production of completely water soluble polymers, when adapting same for industrial applications it often happens that slight process parameter variations or modifications [the so-called "accidental" modifications] at one time or another do in fact give rise to the by-production of objectionable insoluble fractions, or fractions which are more difficultly soluble in water.

Thus, a serious need continues to exist for photopolymerization techniques, other than that described in our said copending application, designed for the preparation of the wholly water soluble polymeric flocculants.

SUMMARY OF THE INVENTION

Accordingly, a primary object of the present invention is the provision of an improved process for the preparation of water soluble organic polymers useful as polymeric flocculants.

Another object of the invention is to provide for the improved photopolymerization of hydrophilic monomers.

Yet another object of the invention is the provision of an improved process for the thin layer photopolymerization of acrylic monomers into high quality polymeric flocculating agents, even in the event that the starting material monomers are not of high purity.

Yet another object of the invention is to provide an improved photopolymerization process yielding polymeric flocculanting agents which are more rapidly soluble in water and which contain no water insoluble fractions.

Still another object of this invention is to provide an improved thin layer photopolymerization process for the preparation of water soluble polymeric flocculants which is operable over a broad range of operating conditions, but which remains flexibly adapted as to preclude concomitant by-production of all but the very slightest amount of insolubles, under the full spectrum of such broad operating conditions, and even where such operating conditions are accidentally or unexpectedly varied or altered during processing.

Another object of the invention is an improved photopolymerization process which ensures against the formation of a fraction of insolubles of "onionskin" type.

Yet another object of the invention is the provision of an improved thin layer photopolymerization wherein solubilization of the resultant flocculating agents is facilitated by enveloping the medium undergoing photopolymerization in a moist, humid gaseous atmosphere.

Briefly, the improved process according to the invention for the preparation of water soluble polymeric flocculating agents especially useful in the treatment of waste and other impure waters features the continuous deposition, onto a moving endless belt or support, of a thin layer or film of an aqueous solution of olefinically unsaturated hydrophilic monomers, and then exposing said deposited thin layer to irradiation with light rays having a wavelength between 150 and 500 m$\mu$, the gaseous atmosphere enveloping or surmounting the medium of photopolymerization being maintained humid during the period of irradiation, including that period of time whereunder photopolymerization of the aqueous solution has progressed to a stage whereat the photopolymerization medium is transformed from liquid state to solid state ["solid state" being defined as any nonliquid, or even nonviscous, state].

DETAILED DESCRIPTION OF THE INVENTION

By "moist" or "humid" atmosphere, there is herein intended an atmosphere or gaseous environment having a content of water vapor, or "relative humidity", such that, at ambient temperature [23° C.], said content in water vapor is greater than 50%, preferably at least 80%, of saturation, i.e., that amount of water which would be contained in an atmosphere fully saturated with water, at an ambient temperature of 23° C. It should nonetheless be appreciated that such amount, namely, the "saturation" amount, could either be the same as, or less than, that amount actually required for saturation under the actually prevailing temperatures in the atmosphere surmounting the medium of photopolymerization.

The atmosphere can be of any type. Typically, same consists of air or of an inert gas, if the presence of oxygen is to be avoided. Nitrogen and argon are the principal inert gases intended [with respect to the polymerization]. An atmosphere free of oxygen [for example, less than 5% by volume, preferably less than 0.5%] is often desirable, but it is also possible to conduct the photopolymerization in the presence of oxygen, especially with suitable additives, or at the completion of the irradiation sequence, when the residual monomer content is low.

The "humid" atmosphere required per this invention is conveniently established simply by circulating or flushing appropriate gaseous stream over the liquid or solid medium of photopolymerization, said gaseous stream, e.g., of nitrogen, having been first bubbled through an aqueous liquid, preferably water, to impart the water vapor content thereto. The temperature of the aqueous liquid through which the bubbling is effected can vary over broad limits, but it is convenient to merely make use of the ordinary ambient temperature at the situs where the process of the invention is being carried out, because this eliminates the need for any special heating or cooling means.

It will be apparent that the temperature of the aqueous liquid through which the bubbling is effected may be modified as a function of the particular degree of humidity desired.

In a preferred embodiment of the invention, the velocity of the flushing stream of the humid atmosphere surmounting the medium of photopolymerization is greater than 0.1 m/s, and advantageously greater than 1 m/s.

The wave length of the irradiation is preferably comprised between 300 and 450 m$\mu$ [ultraviolet radiation].

The photopolymerization of the invention is carried out continuously, by continuously depositing the thin layer of the aqueous monomer(s) solution onto the traveling conveyor belt.

The beginning or starting material monomer solution preferably contains a photopolymerization promoter, and optionally, other photopolymerization aids and additives.

The reactant olefinically unsaturated monomers comprise at least 50% by weight, and preferably at least 80% by weight, of hydrophilic acrylic monomers.

Representative of those monomers especially adapted for photopolymerization according to the invention are: acrylamide, methacrylamide, acrylic acid, methacrylic acid, methallysulfonic acid, and vinylbenzenesulfonic acid and the soluble salts or esters thereof, particularly the alkali metal or ammonium salts, N-vinylpyrrolidone, methyl-2-vinyl-5-pyridine and the aminoalkyl acrylates and methacrylates; these latter compounds are preferably quaternized and preferably contain 4 to 16 carbon atoms in their respective aminoalkyl moieties. Photopolymerization of the aforesaid monomers, wherein individually or in any admixture thereof, results in homopolymeric or copolymeric flocculating agents, the nature and proportions of such monomers naturally being selected as to effect preparation of water soluble polymers; thus, acrylonitrile and methacrylonitrile may also be used as comonomers, but the content thereof is preferably limited with respect to the other monomers to less than 3% by weight.

The preferred monomers are acrylamide, acrylic acid and the alkali metal salts thereof, and the quaternized dialkylaminoalkyl methacrylates [in chloride or sulfate form].

The concentration of monomer(s) in the aqueous monomer solution subjected to photopolymerization per the invention is typically comprised between 30 and 90% by weight. For acrylamide and the various acrylates, the concentration is typically between 30 and 30 and 70%, preferably between 40 and 60% by weight. In the case of the quaternized ammonium salts, particularly those derived from aminoalkyl methacrylates, the concentration typically is between 40 and 90%, preferably between 70 and 88% by weight. In the case of acrylamide in combination with the quaternized aminoalkyl methacrylate salts, the concentration of same in the aqueous monomer solution is typically between 40 and 70% by weight, and preferably between 45 and 65% by weight.

The promoters of the photopolymerization, or photoinitiators, are themselves known. Specifically, the following are noted as representative: diacetyl, dibenzoyl, benzophenone, benzoin and its alkyl ethers, in particular its methyl, ethyl, propyl, isopropyl ethers. The photoinitiator content of the initial monomer solution exposed to photopolymerization is typically between 0.005 and 1% by weight of the monomer or monomers, preferably between 0.01 and 0.5% by weight. Anthraquinone polymerization additives may also be used, as described in French Pat. No. 2,327,258.

The mobile support upon which the aqueous monomer solution to be polymerized is deposited, advantageously comprises an endless conveyor belt, or, in certain embodiments, of several endless conveyor belts in series [the second conveyor belt is utilized only upon solidification of the photopolymerized medium]. The thickness of the aqueous solution subjected to photopolymerization is typically between 2 and 20 mm, preferably between 3 and 8 mm. The mobile support is preferably water repellent; suitable materials comprising the support include the polyperfluoroolefins [homo- or copolymers], and metals [either with or without a covering layer of a water repellent film, such as, for example, a polyester film].

In order to eliminate or dissipate the heat produced during photopolymerization, it is advantageous to cool the mobile photopolymerization support. Cooling is conveniently effected at the lower surface of the mobile support by means of spraying same with cold water. The temperature of the polymerization medium is maintained below approximately 70° C., preferably below 60° C. However, it is possible to dispense with the cooling, in particular after a high proportion of the monomers has already polymerized, for example, when the residual monomer content is less than 10%, preferably less than 2% [by weight with respect to the mass exposed to photopolymerization]. The pH of the aqueous monomer solutions exposed to photopolymerization typically is between 4 and 13. The specific value of the pH depends on various factors, specifically on the particular monomer used and the resultant molecular weights desired, and also on the impurities contained in the monomers. Generally, by raising the pH, cross-linking of the highest molecular weight fractions is prevented [cross-linking giving rise to insoluble fractions], but excessively high pH's are to be avoided, in light of the fact that the monomers are susceptible to saponification.

Per all of the foregoing, the invention features exposing an aqueous solution of olefinically unsaturated hydrophilic monomers to photopolymerization under the aforenoted conditions. However, it should be understood and it is quite apparent that the photopolymerization medium is only initially in the state of an aqueous solution having the aforesaid character and concentrations; rather, as the photopolymerization progresses, the photopolymerization medium becomes increasingly viscous, until it becomes solid. Nonetheless, the ambient atmosphere enveloping, or at least surmounting the medium of photopolymerization, must continuously reflect that degree of humidity as above described.

The photopolymerization itself may be effected in one or more than one stage; one stage may proceed under the UV irradiation until the content in residual monomer has diminished to the desired value. Thereafter, per the foregoing, the irradiation may be continued without the necessity for cooling the traveling belt and even in the presence of oxygen.

In order to further illustrate the present invention and the advantages thereof, the following specific examples are given, it being understood that same are intended only as illustrative and in nowise limitative.

EXAMPLE 1

In a suitable dissolution vessel, the following solution was prepared:

[i] 68.7 kg deionized water;
[ii] 45.6 kg acrylamide;
[iii] 16.9 kg acrylic acid; and
[iv] 18.8 kg of a 50% aqueous solution of sodium hydroxide.

The solution was fed to the head of a packed column; into the same column, also at its head, a sodium hydroxide solution diluted to 30% was introduced to adjust the pH to 13. There were also commenced and maintained, at the center of the column, a 88 cm$^3$/h flow of a 34 g/l solution of benzoin isopropoyl ether in acrylic acid, and, at the base of the column, a flow of nitrogen sufficient to maintain the content of dissolved oxygen in the liquid issuing from the base of the column at less than or equal to 0.15 mg oxygen per liter of solution.

The deaerated aqueous monomer solution was next caused to flow continuously, at a rate of 31 l/h, onto a 48 cm wide continuous stainless steel conveyor belt, provided with two like lateral edge flanges to prevent lateral flow of the deposited solution. The belt, additionally, was slightly inclined in the direction of flow to avoid backflow of the solution. The gaseous environment or atmosphere above the belt was confined by means of glass plate members [height: 3 cm], and same consisted of a stream of moist nitrogen [2 m$^3$/h] humidified as a result of having been bubbled through a wash flask containing 3 liters of water, at ambient temperature. The metal belt was traveling at a velocity of approximately 24 cm per minute. At this velocity, the thickness of the deposited layer of monomer solution was approximately 4.5 mm. The belt, which was cooled at its underside with 15° C. water, was exposed, over a length of 3.6 m, to irradiation by means of eight (8) high pressure mercury lamps, each having an electric power of 2000 watts [Type: Philips HTQ 7]. The eight lamps were arranged along the direction of travel of the belt and 10 cm thereabove.

After 15 minutes of irradiation, a plastic film was obtained, which was removed from the belt by simple stripping.

The film was then broken into fragments by means of a cutter, dried for 15 minutes at about 85° C., and then ground into powder. The properties of the polymer were determined either from the powder or from the broken fragments.

A 5 g/liter solution was next prepared in deionized water, under slow agitation by means of a magnetic agitator, at ambient temperature [approximately 20° C.].

The presence of insolubles was then determined via filtration of the solution prepared in the abovedescribed manner through a frit glass filter having pore diameters between 90 and 150μ. No deposit was found.

The Brookfield viscosity of the aforesaid and one solution additionally containing 50 g/l NaCl was measured at 20° C. and at 10 t/min utilizing vessels and models Nos. 1 and 3, depending on the viscosity of the solution.

The following results were obtained from the final powder:

| [a] | Brookfield viscosity | - aqueous solution | 3000 cpo |
|---|---|---|---|
|  |  | - saline solution | 200 cpo |
| [b] | Intrinsic viscosity |  | 14 dl/g |

Residual monomer [acrylamide] content: 0.4% [with respect to the dry polymer].

EXAMPLE 2

The plastic film obtained after 15 min of irradiation as in Example 1 was detached from the polymerization support [traveling endless belt] and was placed on a second traveling metal support [screen] which was advancing at a velocity of 24 cm/min. The uncooled support was exposed to post-irradiation under a glass shield by means of low pressure mercury lamps [Philips Tlak 40 w/05] arranged perpendicular to the direction of motion of the support. A total of 96 lamps was arranged along a length of 14.5 m. The entire post-irradiation apparatus was enclosed in an enclosure filled with a sweeping current of humid air that had been bubbled through water in the manner as the nitrogen was subjected to in Example 1.

Subsequently, the film [as in Example 1] was cut, dried, ground and analyzed.

A powder having the characteristics of the powder in Example 1 was obtained, except that the residual monomer content was less than 0.05%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the photopolymerization of aqueous solutions of olefinically unsaturated hydrophilic monomers into water soluble polymeric flocculants, by exposing such solutions to photopolymerizing irradiation, the improvement which comprises effecting such photopolymerization in a moist, humid gaseous atmosphere, and maintaining the medium of photopolymerization under such atmosphere until the degree of polymerization of same has progressed to solid state transformation.

2. The process as defined by claim 1, the gaseous atmosphere having a relative humidity of greater than 50%.

3. The process as defined by claim 2, the gaseous atmosphere having a relative humidity of greater than 80%.

4. The process as defined by claim 2, the photopolymerizing irradiation having a wavelength of from 150 to 500 mμ.

5. The process as defined by claim 4, the photopolymerizing irradiation having a wavelength of from 300 to 450 mμ.

6. The process as defined by claims 1 or 4, said photopolymerization being effected by continuously depositing a thin layer of the aqueous monomer solution on a traveling support, and thence exposing such thin layer to the photopolymerizing irradiation.

7. The process as defined by claim 6, the concentration of monomers in the aqueous solutions thereof being between 30 and 90% by weight, and said monomers being selected from the group consisting of acrylamide, methacrylamide, acrylic acid, methacrylic acid, methallylsulfonic acid, vinylbenzenesulfonic acid, the salts and hydrophilic esters thereof, N-vinylpyrrolidone, methyl-2-vinyl-5-pyridine, aminoalkyl acrylate, aminoalkyl methacrylate, and quaternary aminoalkyl acrylate and methacrylate.

8. The process as defined by claim 7, said monomers being selected from the group consisting of acrylamide, acrylic acid, alkali metal salts thereof, and the quaternized dialkylamino methacrylates having from 4 to 16 carbons in the respective aminoalkyl moieties thereof.

9. The process as defined by claim 7, said thin layer having a thickness of from 2 to 20 mm, and the aqueous monomer solution including a concentration of photopolymerization promoter therein ranging from 0.005 to 1% by weight, based upon the total weight of the monomers.

10. The process as defined by claim 9, said thickness being from 3 to 8 mm, and said concentration of promoter ranging from 0.01 to 0.5% by weight.

11. The process as defined by claim 9, the pH of the aqueous monomer solution ranging from 4 to 13, and the traveling support being cooled during photopolymerization.

12. The process as defined by claim 6, said gaseous atmosphere being an inert gas.

13. The process as defined by claim 12, said gaseous atmosphere being nitrogen.

14. The process as defined by claim 6, the gaseous atmosphere having been humidified by being bubbled through an aqueous liquid.

15. The process as defined by claim 11, the oxygen content of the gaseous atmosphere being less than 5% by volume.

16. The process as defined by claim 15, the oxygen content of the gaseous atmosphere being less than 0.5% by volume.

17. The process as defined by claim 11, further comprising a second irradiation step, without cooling, but also under said moist, humid gaseous atmosphere.

18. The process as defined by claim 17, said second irradiation step being effected when the residual monomer content of the photopolymerizing medium is less than 10% by weight.

19. The process as defined by claim 18, said second irradiation step being effected when the residual monomer content of the photopolymerizing medium is less than 2% by weight.

20. A completely water soluble polymeric flocculant, prepared by the process as defined by claims 1 or 11.

21. In a process for the flocculation of waste and other impure waters, the improvement which comprises utilizing, as the flocculating agent therefor, the water soluble polymeric flocculant as defined by claim 20.

* * * * *